(12) United States Patent
Tunney

(10) Patent No.: US 7,036,088 B2
(45) Date of Patent: Apr. 25, 2006

(54) MULTI-MODAL METHOD FOR APPLICATION SWAPPING

(75) Inventor: William Patrick Tunney, Montreal (CA)

(73) Assignee: SAP AG, Walldorf (DE)

( * ) Notice: Subject to any disclaimer, the term of this patent is extended or adjusted under 35 U.S.C. 154(b) by 192 days.

(21) Appl. No.: 10/625,553

(22) Filed: Jul. 24, 2003

(65) Prior Publication Data

US 2005/0022138 A1 Jan. 27, 2005

(51) Int. Cl.
*G06F 3/00* (2006.01)
(52) U.S. Cl. ...................... 715/779; 715/783
(58) Field of Classification Search .............. 715/827, 715/744–748, 778, 864, 865, 779, 783; 345/172
See application file for complete search history.

(56) References Cited

U.S. PATENT DOCUMENTS

| | | | | |
|---|---|---|---|---|
| 5,121,477 A | * | 6/1992 | Koopmans et al. | ......... 715/762 |
| 5,287,514 A | * | 2/1994 | Gram | ......................... 715/826 |
| 5,867,729 A | * | 2/1999 | Swonk | ......................... 710/8 |
| 6,199,125 B1 | * | 3/2001 | Cortesi | ......................... 710/67 |
| 2003/0117440 A1 | * | 6/2003 | Hellyar et al. | .............. 345/767 |

OTHER PUBLICATIONS

Screen Dumps of Microsoft Office 2000 Shortcut Bar (pp. 1-6, 1999).*
Screen Dumps of Microsoft Windows Version 4.0 (pp. 1-3, 1998).*

* cited by examiner

*Primary Examiner*—Kristine Kincaid
*Assistant Examiner*—Lê Nguyen
(74) *Attorney, Agent, or Firm*—Kenyon & Kenyon LLP

(57) ABSTRACT

A multi-modal method for application swapping. An embodiment of a method includes, in response to a first key stroke, displaying a plurality of graphical icons corresponding to running applications, in response to a mouse input, selecting one of the graphical icons, and displaying the running application corresponding to the selected icon. The method enables a user to quickly and easily swap between currently running applications using a keyboard and a mouse.

7 Claims, 4 Drawing Sheets

MULTI-MODAL METHOD FOR APPLICATION SWAPPING

BACKGROUND

Many Windows-based operating systems allow a user to swap between running applications by using the ALT+TAB key combination. This combination causes a display window to appear which includes graphical icons for all the currently running applications. By holding down the ALT key while repeatedly pressing the TAB key, a user may cycle through the graphical icons until she reaches the icon corresponding to the running application she wishes to view. As the user cycles through the icons, each successive icon is highlighted. An exemplary highlight mark is a box-outline around the icon. Upon reaching the desired icon, the user may release the ALT+TAB key combination and the currently displayed application is swapped with a new application corresponding to the desired icon.

However, a concern with these systems occurs when the user has a large number of applications running at once. In this case, the user may have to press the TAB key numerous times before reaching the desired icon and swapping to the desired application. In one instance, the user may wish to access a reference window, e.g., an API browser, that is running, but not accessed often. When the user does need to access the reference window, the user wishes to do so quickly. However, the user must press the TAB key numerous times to reach the reference window icon. In another instance, the user may wish to return to a recently viewed application. In some Windows-based operating systems, if the user previously minimized the application windows using the WINDOWS_KEY+M key combination (e.g., in order to access data stored on the desktop) and then used the ALT+TAB key combination, the graphical icons of the most recently viewed applications appear last in the display window. Hence, the user is forced to tab through the entire list before reaching the desired icon. Additionally, if the user cycles through the list too quickly and passes over the desired icon, the user must now awkwardly press the SHIFT key, in addition to holding down the ALT key and pressing the TAB key, in order to tab backward to the desired icon. Or the user must tab forward through the entire list again until reaching the desired icon. These waste time and effort. As a result, the intended effectiveness of the ALT+TAB key combination is reduced.

As an alternative to the ALT+TAB generated display window, some systems provide a taskbar for listing the currently running applications. The taskbar is generally disposed across the bottom of the display screen and provides an application icon for each running application. The user typically uses the mouse to click on an application icon to view the corresponding application.

However, there is still a concern when the user has a large number of applications running at once. The width of the taskbar is limited to the width of the display screen. Thus, the width of each application icon is limited to an equally divisible portion of the taskbar. The more applications running, the greater the number of icons to fit on the taskbar and, hence, the narrower each icon width. So, where there are several applications running, the corresponding icons on the taskbar are too narrow for the user to read. The user instead must move the mouse over each icon as an information window pops up and displays an application descriptor. Or the user must click on the icon and display the application in order to identify it. Alternatively, the user may extend the height of the taskbar to provide multiple rows for the application icons. However, the more applications running, the greater the taskbar height and, hence, the less available display space on the screen. None of these options are ideal, all wasting time and effort.

Accordingly, there is a need in the art for a method to quickly and easily swap between currently running applications.

SUMMARY OF THE INVENTION

Embodiments of the present invention provide a method for swapping between currently running applications. These embodiments provide a multi-modal input mechanism that improves the effectiveness of the ALT+TAB key combination when application swapping, using a keyboard and a mouse. The method includes displaying the graphical icons corresponding to the currently running applications in response to an ALT+TAB key combination. The method further includes selecting one of the graphical icons in response to a mouse input and displaying the running application corresponding to the selected icon. The method advantageously improves the speed and ease of application swapping when using the ALT+TAB key combination.

DETAILED DESCRIPTION

Embodiments of the present invention provide a multi-modal method for swapping between currently running applications. Embodiments use the ALT+TAB key combination and the mouse to select one of the applications to view. The ALT+TAB key combination causes a window to appear on the display screen, the window containing graphical icons corresponding to the currently running applications. The mouse may then be used to click on one of the graphical icons, causing the application corresponding to the selected icon to appear on the display screen.

By using the mouse with the ALT+TAB key combination, the user is able to directly select the desired icon by clicking on it with the mouse rather than TAB to it. Accordingly, the multi-modal combination of the keyboard and mouse provides a quick and easy way to swap between currently running applications, particularly when there is a large number of applications running at once.

Figure 1:
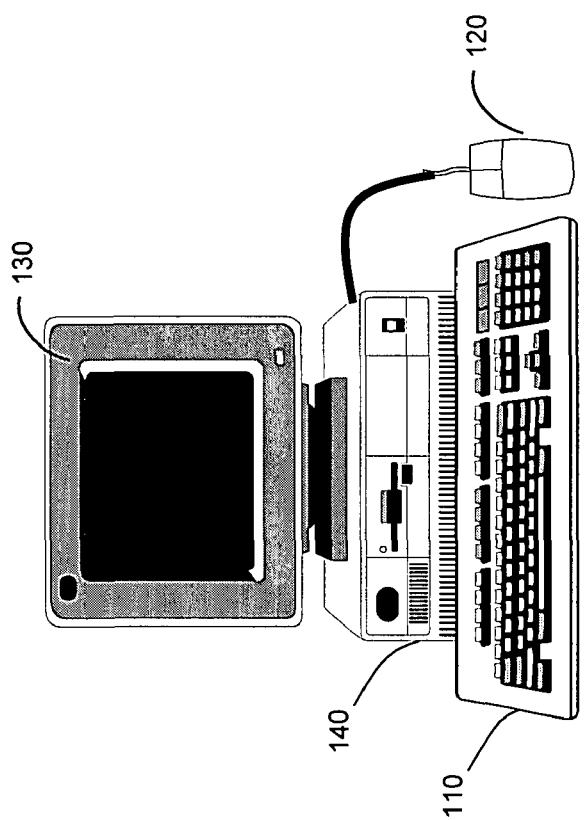
FIG. 1 is an exemplary computer used for application swapping according to embodiments of the present invention.

FIG. 1 shows an exemplary computer that may be used to implement embodiments of the present invention. The computer 100 may include input/output devices, such as a keyboard 110, a mouse 120, and a display screen 130, and a processing core 140 to process inputs from the keyboard 110 and mouse 120 and outputs to the display screen 130. The core 140 may include, but is not limited to, a processor provided in communication with a system memory module, a storage device, and possibly other I/O devices (not shown). The processor may process the inputs and outputs. The memory may store program instructions to be executed by the processor and also may store variable data generated pursuant to program execution. The program instructions may represent an operating system of the computer 100 and/or application programs. In practice, the memory may be a memory system including one or more electrical, magnetic, or optical memory devices. The I/O devices may include serial and parallel ports for interface between the keyboard 110, mouse 120, display screen 130, and core 140.

Embodiments of the present invention may implement the multi-modal method by modifying an existing ALT+TAB key combination event handler to include routines to handle mouse-based events. Such events may include an event detecting a position of the mouse pointer relative to the graphical icons (a "mouse focus" event) and an event receiving a mouse click indicating selection of one of the icons (a "mouse click" event). When the event handler displays the graphical icons upon receipt of the ALT+TAB key combination, it may use information about the currently running applications including the icon of the application, a text string describing the icon, i.e., the application descriptor, the (x,y) coordinates and size of the icon on the display screen, an application icon id for each active application, and a pointer to the currently highlighted icon. The mouse-based events that are added to the existing event handler also make use of this information, as will be described below.

The mouse focus event may emulate the pressing of the TAB key. When the user moves the mouse pointer to the desired icon, the event handler may process the event in terms of the number of TAB key presses to be performed in order to move to and highlight the desired icon. To do this, the event handler may first detect the (x,y) coordinates of the mouse pointer on the display screen. The event handler may then match the (x,y) coordinates of the mouse pointer with the region on the display screen occupied by a graphical icon. The application icon id of the matched graphical icon may then be retrieved.

If the application icon id of the currently highlighted icon and that of the icon currently pointed to are the same, then the event handler need not perform the mouse focus event. That is, the mouse pointer may be pointing to the already highlighted icon. So, the event handler need not swap applications. However, if not, then the event handler may calculate the number of TAB key presses required to move from the currently highlighted icon to the icon currently pointed at. The event handler may then perform the number of TAB key presses to visually highlight the newly selected icon and to internally associate the pointer with the newly selected icon.

TABLE 1 shows exemplary code that may demonstrate a methodology for the mouse focus event OnMouseMove that performs the functions as described above. This code is illustrative of what one might find in a Windows implementation of embodiments of the present invention.

TABLE 1

Mouse Focus Event Source Code

```
// Mouse handler that monitors mouse coordinates and is called whenever
// the mouse coordinates change. This extension to the ALT+TAB event handler
// tests if the user is holding the ALT key while moving the mouse. If the user
// is holding the ALT key and the mouse pointer is placed over an application
// icon, OnKeyDown events are fired until the application icon is highlighted,
// equating to TAB key presses.
void OnMouseMove(UINT nFlags, CPoint point)
{
```

TABLE 1-continued

Mouse Focus Event Source Code

```
ApplicationLink *temp = head;
int iconIndex = 0;
int count =0;
// Cycle through all graphical icons in the list until either
// the currently highlighted icon is found or the end of the
// list is reached.
while(temp != NULL)
{
   count++;
   if(temp->PointtInArea(point))
   {
      iconIndex = count;
      break;
   }
   temp = temp->next;
}
// if the mouse pointer points to an icon
if(iconIndex != 0)
{
   int difference = 0;
   // If the pointed to icon is not the same as and is listed
   // after the currently highlighted icon, then calculate the
   // number of TABs to get to the pointed to icon.
   if(iconIndex > iconSelected)
   {
      difference = iconIndex-iconSelected;
   }
   // If the pointed to icon is the same as the currently
   // highlighted icon, then do nothing.
   else if (iconIndex == iconSelected)
   {
      return;
   }
   // If the pointed to icon is not the same as and is listed
   // before the currently highlighted icon, then calculate
   // the number of TABs to get to the pointed to icon.
   else
   {
      difference = (numberOfApplications-
            iconSelected)+iconIndex;
   }
   // Fire the number of TABs to get to the pointed to icon
   for(int i=0; i<difference; i++)
   {
      OnKeyDown(81,0,0);
   }
}
   OnMouseMove(nFlags, point);
}
```

The mouse click event may emulate the release of the ALT key. After the user has reached the desired icon by using either the TAB key or the mouse pointer, the user may click a mouse button to select the desired icon. The event handler may then perform the ALT release function, which causes the application corresponding to the selected icon to appear on the display screen and simultaneously the window displaying the graphical icons to disappear. In these embodiments, either the left, right, or middle, if available, mouse button may be configured to trigger the mouse click event depending on the application.

TABLE 2 shows exemplary code that may demonstrate a methodology for the mouse click event OnLButtonDown that performs the functions as described above. This code is illustrative of what one might find in a Windows implementation of embodiments of the present invention.

TABLE 2

Mouse Click Event Source Code

```
// Mouse handler that monitors when the left mouse button is clicked.
// If the mouse points to an application icon while the list of graphical icons
// is displayed, then an event OnKeyUp is fired equating to the user releasing
// the ALT key.
void OnLButtonDown(UINT nFlags, CPoint point)
{
  // if left mouse click & an icon is selected
  if(iconSelected != 0)
  {
    ApplicationLink *temp = head;
    int iconIndex = 0;
    int count =0;
    // Cycle through all graphical icons in the list until either
    // the currently highlighted icon is found or the end of the
    // list is reached.
    while(temp != NULL)
    {
      count++;
      if(temp->PointtInArea(point))
      {
        iconIndex = count;
        break;
      }
      temp = temp->next;
    }
    // if the mouse pointer points to an icon
    if(iconIndex != 0)
      // display the application corresponding to the icon
      OnKeyUp(17, 0, 0);
      return;
  }
  OnLButtonDown(nFlags, point);
}
```

Figure 2:
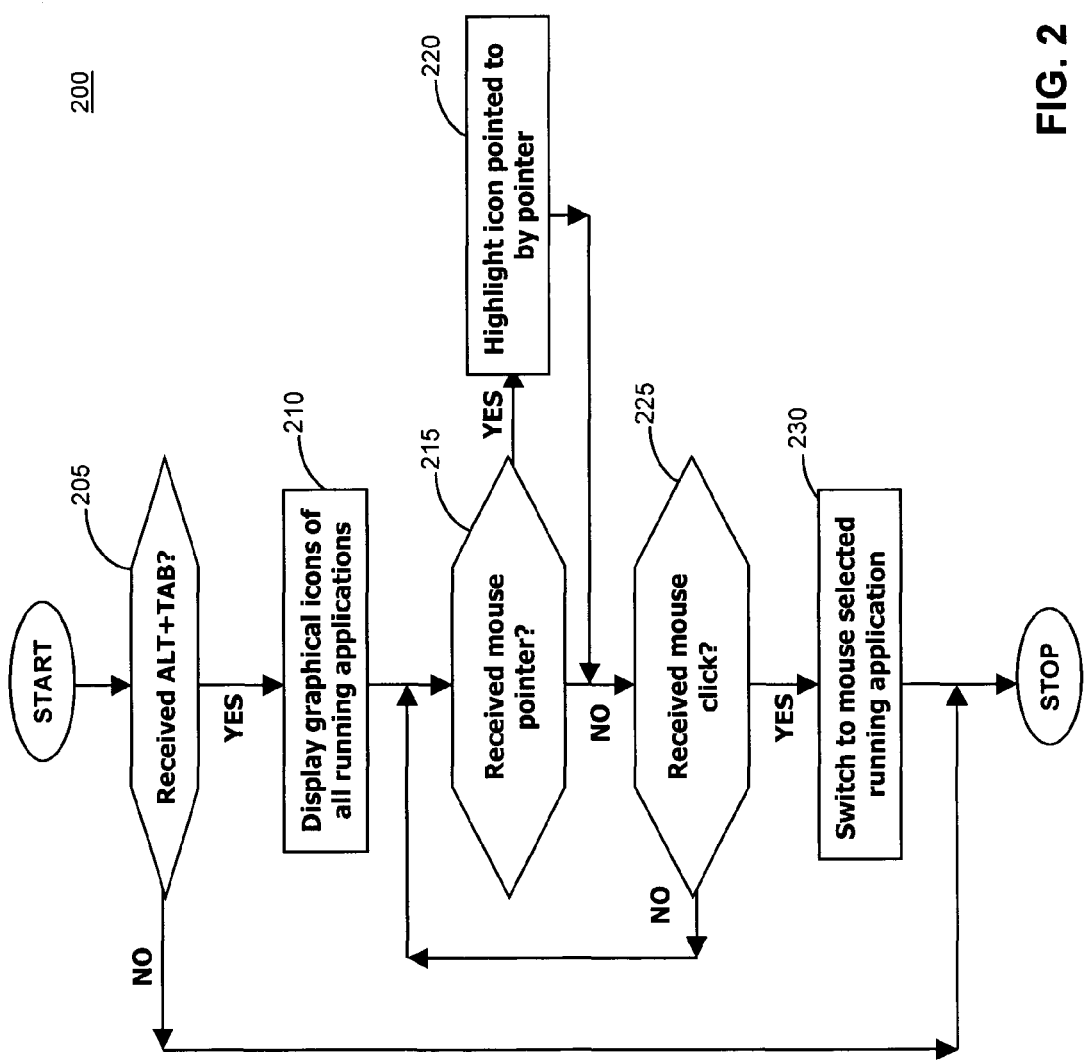
FIG. 2 is a flowchart of an embodiment of a method according to the present invention.

FIG. 2 is a flowchart of an embodiment of a method for application swapping according to the present invention. The processor may receive (205) an ALT+TAB key combination input from the keyboard 110. The processor may then run the event handler to handle the ALT+TAB event, where the processor may display (210) graphical icons corresponding to the currently running applications on the display screen 130.

While the user continues to hold the ALT key down, the processor may wait to receive the mouse-based events. The processor may receive (215) a mouse focus event from the mouse 120 as the user moves the mouse pointer to point to the desired graphical icon. On the display screen 130, a graphical icon may be highlighted (220) as the mouse pointer moves over it. Concurrently, the processor may resolve the coordinates of the pointer with the graphical icon and associate the pointer with the graphical icon, as previously described.

After the desired icon is highlighted, if the user clicks on it, the processor may receive (225) a mouse click event. The processor may then release the display of graphical icons and switch (230) to the application corresponding to the selected icon, emulating a release of the ALT key. Anytime thereafter, the user may physically release the ALT key.

If the user has not clicked on an icon, then the processor may receive (215). additional mouse focus events, if any, while waiting to receive (225) a mouse click event. After the user clicks on an icon with the mouse, the processor may switch (230) to the application corresponding to the currently highlighted icon.

Figure 3:
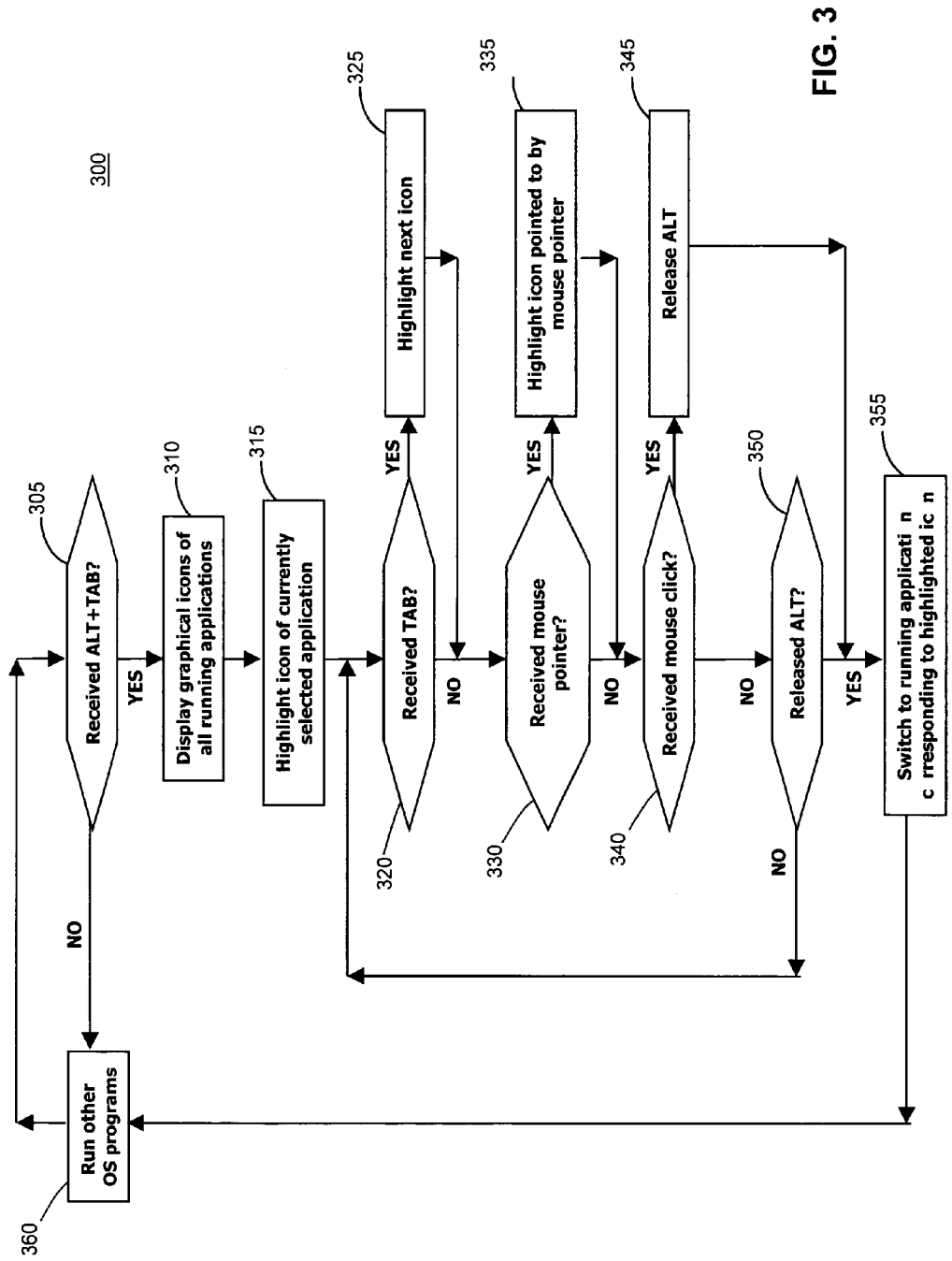
FIG. 3 is a flowchart of an alternate embodiment of a method according to the present invention.

FIG. 3 is a flowchart of an alternate embodiment of a method for application swapping according to the present invention. The processor may continue to run (360) other operating system programs until it receives (305) an ALT+TAB key combination as input. After receiving the ALT+TAB key combination input, the processor may then display (310) graphical icons corresponding to all the currently running applications. In the display window, the icon of the application currently selected may be highlighted (315). The user may continue to hold down the ALT key.

If the processor receives (320) a TAB key press as input, the next icon in the display window may be highlighted (325). If the processor does not receive (320) a TAB key input, then the processor may determine whether the user has moved the mouse pointer to point to an icon. If so, the processor may receive (330) the mouse pointer input and the mouse focus event may be triggered. The processor may then resolve the mouse pointer input using a technique as previously described, for example, and highlight (335) the icon pointed to.

Next, the processor may determine whether the user has clicked on the highlighted icon with the mouse. If so, the processor may receive (340) the mouse click input and the mouse click event may be triggered. Upon receiving the mouse click input, the processor may perform the routine that releases (345) the ALT key. The processor may then switch (355) to the application corresponding to the highlighted icon. Anytime thereafter, the user may physically release the ALT key.

If the processor does not receive (330, 340) a mouse pointer input or a mouse click input, then the processor may determine (350) whether the user has released the ALT key. If so, the processor may switch (355) to the application corresponding to the highlighted icon. If the user has not released the ALT key, then the processor may wait for receipt of a TAB key input (320), a mouse pointer input (330), or a mouse click input (340) in order to select and switch to one of the running applications.

After the ALT+TAB+mouse combination has completed, the processor may then run (360) other operating system programs until receiving the next ALT+TAB input.

Figure 4:
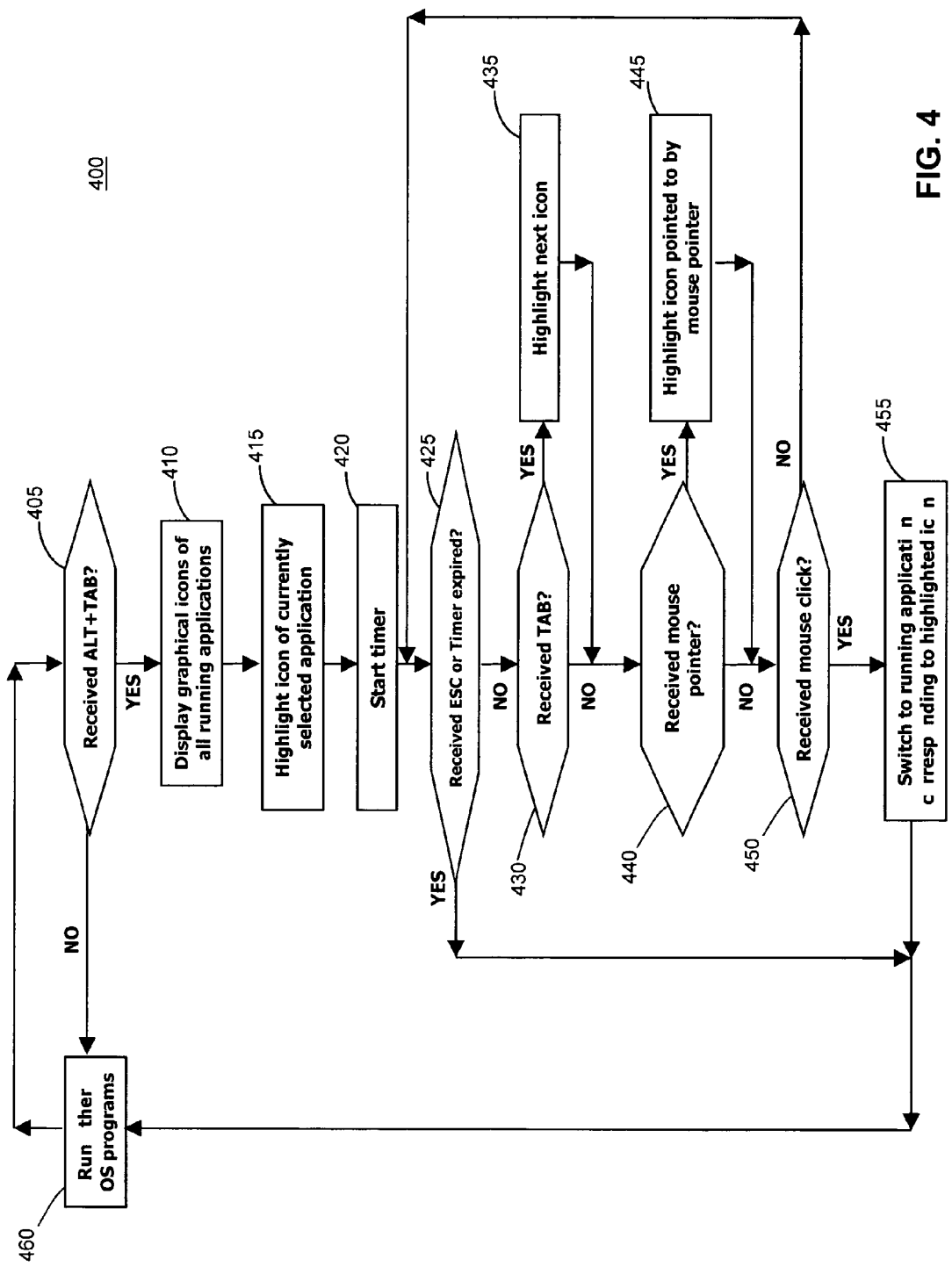
FIG. 4 is a flowchart of another alternate embodiment of a method according to the present invention.

FIG. 4 is a flowchart of another alternate embodiment of a method for application swapping according to the present invention. In this embodiment, the user need not continue to hold down the ALT key while using the TAB key or the mouse to select an application to switch to. Instead, the user may press the ALT+TAB key combination and then release it. The processor may receive (405) the ALT+TAB input and display (410) graphical icons corresponding to the currently running applications on the display screen 130. The icon corresponding to the currently selected application may be highlighted (415). The processor may continue to display the icons for a predetermined time period after the user has released the ALT key. A timer may start (420) after the icons are displayed and the ALT key released in order to measure the predetermined time period.

While the timer has not expired or the user has not pressed the ESC key (425), the processor may determine whether input from either the keyboard 110 or the mouse 120 has been received. Similar to FIG. 3, if the processor receives (430) a TAB input, then the next icon in the display window may be highlighted (435). If the processor receives (440) a mouse pointer input, then the processor may highlight (445) the icon that the pointer points to. If the processor receives (450) a mouse click input, then the processor may switch (455) to the application corresponding to the highlighted icon.

After the timer has expired or the user has pressed an ESC key (425), the processor may end the ALT+TAB+mouse combination and then run (460) other operating system programs until receiving the next ALT+TAB input.

It is to be understood that the present application is not limited to the ALT+TAB key combination, but may include any key strokes, individually or in combination, that may be configured to perform embodiments of the present invention.

It is to be further understood that embodiments are not limited to the combination of a keyboard and a mouse. Any other device, such as a trackball, a touch pad, a touch screen, a stylus, or a laser pen, capable of providing input to a processor may be used to replace either or both the keyboard and/or mouse.

Embodiments of the present invention may be implemented using any type of computer, such as a general-purpose microprocessor, programmed according to the teachings of the embodiments. The embodiments of the present invention thus also includes a machine readable medium, which may include instructions used to program a processor to perform a method according to the embodiments of the present invention. This medium may include, but is not limited to, any type of disk including floppy disk, optical disk, and CD-ROMs.

It may be understood that the structure of the software used to implement the embodiments of the invention may take any desired form, such as a single or multiple programs. It may be further understood that the method of an embodiment of the present invention may be implemented by software, hardware, or a combination thereof.

The above is a detailed discussion of the preferred embodiments of the invention. The full scope of the invention to which applicants are entitled is defined by the claims hereinafter. It is intended that the scope of the claims may cover other embodiments than those described above and their equivalents.

What is claimed is:

1. A method comprising:
   in response to a key stroke comprising an ALT+TAB key combination, displaying a plurality of graphical icons corresponding to running applications;
   detecting coordinates of a mouse pointer in a display screen displaying the plurality of graphical icons;
   associating the coordinates with one of the plurality of graphical icons;
   calculating a number of TAB key presses required to move from a currently highlighted icon to the icon associated with the coordinates;
   highlighting the icon associated with the coordinates;
   receiving a mouse click event to select the highlighted icon; and
   displaying the running application corresponding to the selected icon.

2. A method comprising:
   determining whether an ALT+TAB keystroke has been received;
   if so, displaying a plurality of graphical icons representing currently running applications;
   highlighting a currently selected application of the currently running applications;
   determining whether a TAB keystroke has been received;
   if so, highlighting a next icon;
   determining whether an input from a pointing device has been received;
   if so, associating coordinates of the pointing device with one of the plurality of graphical icons, calculating a number of TAB key presses required to move from a currently highlighted icon to the icon associated with the coordinates and highlighting the icon associated with the coordinates;
   determining whether the ALT key has been released; and
   if so, switching to the currently running application represented by the selected icon.

3. The method of claim 2, wherein the pointing device is one of a mouse, a stylus, a laser pen, a trackball, a touch pad, and a touch screen.

4. The method of claim 2, further comprising:
   if a predetermined time period has not expired or an ESC key stroke has been received, stopping the method.

5. A machine readable medium containing program instructions for execution on a processor, which when executed by the processor, cause the processor to perform a method according to claim 1.

6. A machine readable medium containing program instructions for execution on a processor, which when executed by the processor, cause the processor to perform a method according to claim 2.

7. A method comprising:
   determining whether an ALT+TAB keystroke has been received;
   if so, displaying graphical icons representing currently running applications in response and continuing to display the graphical icons after the ALT+TAB keys are released;
   highlighting the graphical icon representing the currently selected running application;
   starting a timer to measure a predetermined time period, and before the timer expires or an ESC keystroke is received,
      in response to a TAB key stroke, highlighting the graphical icon immediately adjacent to the highlighted icon; or
      in response to a first mouse input, associating coordinates of the mouse with one of the plurality of graphical icons, calculating a number of TAB key presses required to move from a currently highlighted icon to the icon associated with the coordinates and highlighting the icon associated with the coordinates;
      in response to a second mouse input, switching to the application represented by the icon highlighted in response to the first mouse input.

* * * * *